(12) United States Patent
Lee

(10) Patent No.: US 7,817,859 B2
(45) Date of Patent: *Oct. 19, 2010

(54) METHOD AND SYSTEM FOR IDENTIFYING OBJECTS IN AN IMAGE

(75) Inventor: Harry C. Lee, Maitland, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1513 days.

This patent is subject to a terminal disclaimer.

(21) Appl. No.: 11/166,374

(22) Filed: Jun. 27, 2005

(65) Prior Publication Data

US 2006/0062458 A1    Mar. 23, 2006

Related U.S. Application Data

(63) Continuation of application No. 10/379,909, filed on Mar. 6, 2003, now Pat. No. 6,912,309.

(51) Int. Cl.
G06K 9/00 (2006.01)
G06K 9/48 (2006.01)
G06K 9/40 (2006.01)
G06K 9/36 (2006.01)

(52) U.S. Cl. .................. 382/199; 382/181; 382/275; 382/284; 382/197

(58) Field of Classification Search .................. None
See application file for complete search history.

(56) References Cited

U.S. PATENT DOCUMENTS

| 4,201,958 | A | * | 5/1980 | Ahamed | 341/143 |
|---|---|---|---|---|---|
| 4,396,903 | A | * | 8/1983 | Habicht et al. | 382/103 |
| 4,618,989 | A | * | 10/1986 | Tsukune et al. | 382/203 |
| 4,644,172 | A | * | 2/1987 | Sandland et al. | 250/548 |
| 4,908,872 | A | * | 3/1990 | Toriu et al. | 382/197 |
| 5,019,903 | A | * | 5/1991 | Dougall et al. | 348/448 |
| 5,119,324 | A | * | 6/1992 | Ahsan | 708/520 |
| 5,355,446 | A | * | 10/1994 | Maayan | 345/626 |
| 5,357,353 | A | * | 10/1994 | Hirota | 358/530 |
| 5,412,197 | A | * | 5/1995 | Smith | 235/462.1 |
| 5,867,592 | A | * | 2/1999 | Sasada et al. | 382/154 |
| 5,936,674 | A | | 8/1999 | Kim | |
| 5,940,539 | A | * | 8/1999 | Kondo et al. | 382/236 |
| 6,134,353 | A | * | 10/2000 | Makram-Ebeid | 382/259 |

(Continued)

OTHER PUBLICATIONS

European Search Report in corresponding EU Appln No. 04005016.3-1224/1462994 dated Jul. 10, 2008.

(Continued)

Primary Examiner—Vikkram Bali
Assistant Examiner—Michelle Entezari
(74) Attorney, Agent, or Firm—Buchanan Ingersoll & Rooney PC

(57) ABSTRACT

Methods and apparatus for identifying objects in an image include processing the image with a gradient operator to produce a gradient magnitude and direction for each pixel. A number of different gradient directions in a portion of the processed image is determined. The portion of the processed image is identified as an object if the number of different gradient directions exceeds a threshold number of gradient directions. The determination of the gradient directions can be simplified by employing a lookup table.

32 Claims, 10 Drawing Sheets

U.S. PATENT DOCUMENTS

| | | | |
|---|---|---|---|
| 6,208,763 B1 * | 3/2001 | Avinash | 382/254 |
| 6,289,112 B1 * | 9/2001 | Jain et al. | 382/116 |
| 6,360,005 B1 * | 3/2002 | Aloni et al. | 382/148 |
| 6,366,699 B1 * | 4/2002 | Kuwano et al. | 382/199 |
| 6,377,698 B1 * | 4/2002 | Cumoli et al. | 382/101 |
| 6,408,109 B1 | 6/2002 | Silver et al. | |
| 6,535,651 B1 * | 3/2003 | Aoyama et al. | 382/300 |
| 6,658,145 B1 | 12/2003 | Silver et al. | |
| 6,661,842 B1 | 12/2003 | Abousleman | |
| 6,697,537 B2 * | 2/2004 | Norimatsu | 382/275 |
| 6,775,409 B1 * | 8/2004 | Brunelli et al. | 382/199 |
| 6,807,286 B1 * | 10/2004 | Krumm et al. | 382/103 |
| 6,912,309 B2 * | 6/2005 | Lee | 382/197 |
| 7,149,356 B2 * | 12/2006 | Clark et al. | 382/209 |
| 7,430,303 B2 * | 9/2008 | Sefcik et al. | 382/103 |
| 7,627,178 B2 * | 12/2009 | Suzuki et al. | 382/190 |
| 2002/0021365 A1 * | 2/2002 | Yang et al. | 348/445 |
| 2003/0122815 A1 * | 7/2003 | Deering | 345/419 |
| 2003/0223627 A1 * | 12/2003 | Yoshida et al. | 382/128 |

OTHER PUBLICATIONS

Sefcik, J.A. et al, "Screening Closing Scenarios for Tactical Targets", Proceedings of the SPIE—The International Society for Optical Engineering Spie—Int. Soc. Opt. Eng USA, vol. 4714, 2002, pp. 223-230.

Minor, L.G. et al, "The Detection and Segmentation of Blobs Infrared Images" IEEE Transactions on Systems, Man and Cybernetics USA, vol. SMC-11, No. 3, Mar. 1981 (1981-2003), pp. 194-201.

Lee, H.C. et al, "Target Recognition and Tracking in an Infrared System", Proceedings of the SPIE—The International Society for Optical Engineering Spie—Int. Soc. Opt. Eng USA, vol. 4365, 2001, pps. 88-92.

Lee, H.C. et al, "Hierarchical Target Model Analysis of Tactical Thermal Imagery", Proceedings of the SPIE—The International Society for Optical Engineering SPIE—Int. Soc. Opt. Eng. USA, vol. 4726, 2002, pp. 114-121.

Minor, L.G., "Application of Pattern Recognition and Image Processing Techniques to Lock-on-after-launch Missile Technology", Apr. 5, 1981, pp. 460-464.

\* cited by examiner

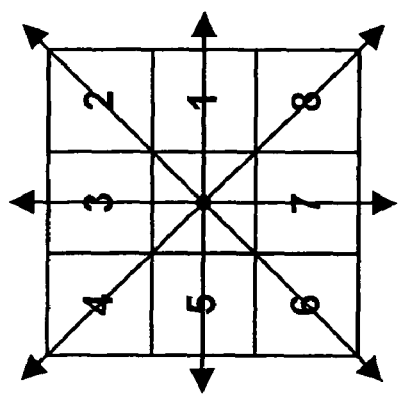
Figure 3B
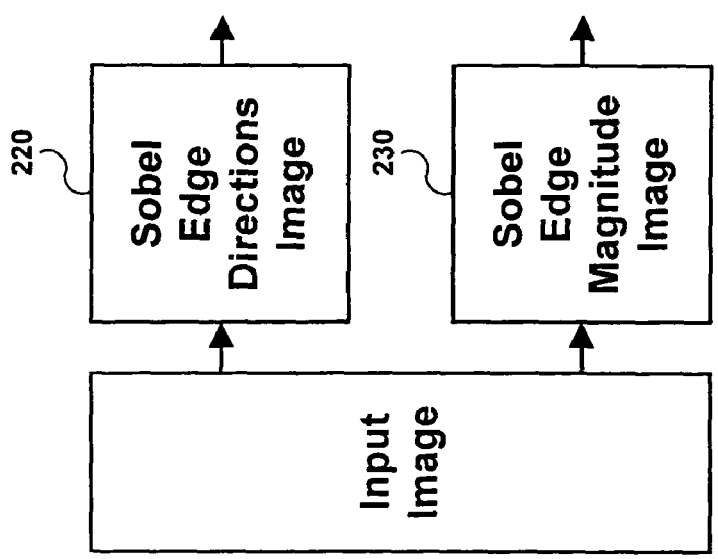
Figure 3A
Figure 2

| Edge Direction | Bit Encoded Edge Direction | Value of Encoded Edge Direction |
|---|---|---|
| 1 | 00000001 | 1 |
| 2 | 00000010 | 2 |
| 3 | 00000100 | 4 |
| 4 | 00001000 | 8 |
| 5 | 00010000 | 16 |
| 6 | 00100000 | 32 |
| 7 | 01000000 | 64 |
| 8 | 10000000 | 128 |

Figure 4

| Dy>=0 | Dx>=0 | Abs(Dx) > Abs(Dy) | OR'ed Value | Direction |
|---|---|---|---|---|
| 000 | 000 | 000 | 000 | 6 |
| 000 | 000 | 001 | 001 | 5 |
| 000 | 010 | 000 | 010 | 7 |
| 000 | 010 | 001 | 011 | 8 |
| 100 | 000 | 000 | 100 | 3 |
| 100 | 000 | 001 | 101 | 4 |
| 100 | 010 | 000 | 110 | 2 |
| 100 | 010 | 001 | 111 | 1 |

Figure 11

METHOD AND SYSTEM FOR IDENTIFYING OBJECTS IN AN IMAGE

RELATED APPLICATIONS

This application is a continuation of application Ser. No. 10/379,909, filed Mar. 6, 2003, now U.S. Pat. No. 6,912,309 which is incorporated herein by reference in its entirety.

BACKGROUND

1. Field of Invention

The present invention relates to processing of image data. More particularly, the present invention relates to a method and apparatus for identifying objects in an image.

2. Background Information

Historically, reconnaissance information has provided important information used in planning military operations. For example, prior to the advent of photography, scouts would be sent out to collect information regarding natural resources such as lakes and rivers, enemy troop information and the like. With the advent of photography, these scouts would provide reconnaissance information by capturing a scene of enemy installations, battlefields, and the like, using photographs. As technology advances, new methods are provided for collecting reconnaissance information. For example, it is quite common today to have reconnaissance planes, manned or remotely controlled, or satellites capture a scene for reconnaissance purposes. In addition to conventional photographic techniques, a scene can be captured using infrared detectors and the like.

Typically scenes captured by reconnaissance techniques have been analyzed by humans in order to determine the content of the captured scene. For example, a human would analyze a photograph to determine the location of bodies of water, the location of enemy troops and the location of man-made objects such as buildings and lines of communication. The human who analyzed the photograph would then have to relay the determined information to people in the field, for example, to an airplane pilot in order to identify targets. However, using humans to analyze photographs is very labor intensive. Further, there can be a considerable delay between the time when a scene is captured and the time in which the information in the captured scene is relayed to persons in the field.

SUMMARY OF THE INVENTION

In accordance with a first exemplary aspect of the present invention a method and apparatus for identifying objects in an image is provided. In accordance with the aspect the image is processed with a gradient operator to produce a gradient magnitude and direction for each pixel. A number of different gradient directions in a portion of the processed image are determined. The portion of the processed image is identified as an object if the number of different gradient directions exceeds a threshold number of gradient directions.

In accordance with another aspect of the present invention a method and apparatus for identifying objects in an image are provided. In accordance with this aspect, a gradient magnitude is determined for each pixel in the image. A gradient direction for each pixel in the image is determined, the gradient direction being determined using a look up table.

BRIEF DESCRIPTION OF THE DRAWINGS

Other objects and advantages of the invention will become apparent to those skilled in the art upon reading the following detailed description of preferred embodiments, in conjunction with the accompanying drawings, wherein like reference numerals have been used to designate like elements, and wherein:

FIG. 2 is a block diagram of the processing performed to produce a gradient magnitude image and a gradient direction image in accordance with exemplary embodiments of the present invention.

FIG. 3A illustrates gradient direction values in accordance with exemplary embodiments of the present invention.

FIG. 3B illustrates and exemplary convolution kernel for processing an image in accordance with exemplary embodiments of the present invention.

FIG. 4 is a table for encoding edge directions in accordance with exemplary embodiments of the present invention.

FIG. 11 illustrates and exemplary look-up table in accordance with exemplary embodiments of the present invention.

DETAILED DESCRIPTION

In accordance with exemplary embodiments of the present invention, portions of an image are processed to determine the number of different gradient directions present in the portion of the image. Through empirical analysis, it has been determined that closed objects, or nearly closed objects, in an image typically includes a predetermined number of different edge directions. For example, if the directions in an edge direction image are quantitized to one of eight unique directions, an object will normally comprise six, seven or eight different edge directions. It should be recognized that a quantitization of eight edge directions is merely exemplary, and that the present invention is equally applicable to other quantitizations, e.g., 16 or 32 edge directions. If other quantitizations are employed, the number of different edge directions used for identifying objects in an image can be determined by one of ordinary skill in the art through routine empirical analysis.

Figure 1:
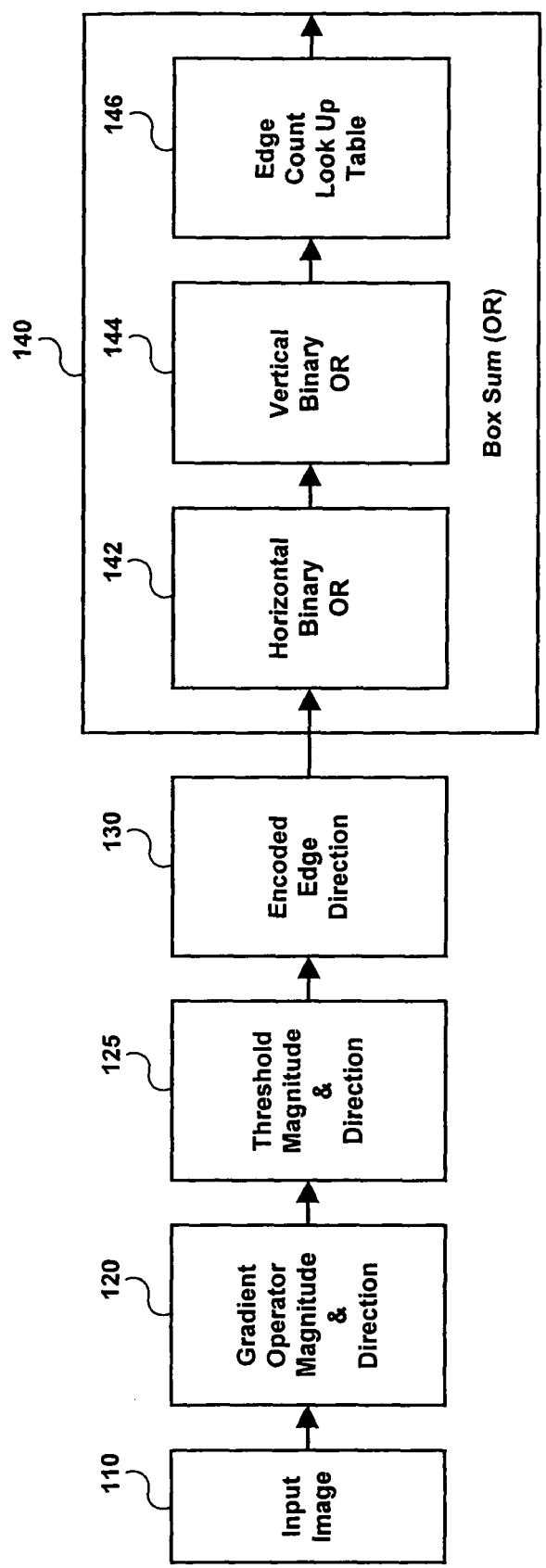
FIG. 1 is a block diagram of the processing performed for identifying objects in an image in accordance with exemplary embodiments of the present invention.

FIG. 1 is a block diagram of the processing performed for identifying objects in an image in accordance with exemplary embodiments of the present invention. An input image 110 is provided to processing block 120, where a gradient operator determines the gradient direction and gradient magnitude of each pixel in the input image 110. After determining the gradient magnitude and gradient direction, a threshold function can be determined as a function of the magnitude and applied to the gradient magnitude to remove background noise (e.g., based on empirical information). If the gradient magnitude of a particular pixel is below the threshold, the gradient magnitude and gradient direction for that pixel are discarded. Conversely, if the gradient magnitude is above the threshold, the gradient magnitude and gradient direction are retained. The values of each pixel in the gradient direction image are encoded by processing block 130. Processing block 140 performs a box sum OR operation on the encoded edge direction image. Specifically, processing block 140 operates on portions of the encoded edge direction image to determine whether the portion contains an object. The size of the portion which is processed is selected to equal the size of objects which it is desired to identify in the image.

For each portion of the image a horizontal binary OR operation 142 is performed, followed by a vertical binary OR operation 144. The result of these operations are input to an edge count lookup table in processing block 146, which outputs a value indicating the number of different edge directions present in the portion of the image processed by processing block 140. Specifically, the output can include the thresholded gradient magnitude and gradient direction image with an indication of the number of different directions present in each portion of the image or an indication of which portions of the image contain objects. The output can be provided on a display or in printed form. If this processing is part of an automated system, the output can be in the form of coordinates of where objects are located in the images.

FIG. 2 is a block diagram of the processing performed by processing block 120. Specifically, an input image is processed by a gradient operator to output a gradient direction image 220 and a gradient magnitude image 230. In accordance with exemplary embodiments of the present invention, a Sobel operator is employed as the gradient operator. However, one of ordinary skill in the art will recognize that there are many other types of gradient operators which may be employed. FIG. 3A illustrates the values corresponding to each gradient direction. FIG. 3B illustrates the convolution kernel employed for processing the image to produce the gradient direction image and the gradient magnitude image. Specifically, a gradient x vector is calculated in accordance with the following equation:

$$D_x = a + 2*d + g - c - 2*f - i \quad (1)$$

A gradient y vector is calculated in accordance with the following equation:

$$D_y = a + 2*b + c - g - 2*h - i \quad (2)$$

Using the gradient x and y vectors, the gradient magnitude and gradient direction are calculated as follows:

$$\text{Magnitude} = \sqrt{D_x^2 + D_y^2} \quad (3)$$

$$\text{Direction} = \arctan\left(\frac{D_y}{D_x}\right) \quad (4)$$

Returning now to FIG. 1, the gradient direction image is encoded. FIG. 4 illustrates the encoding performed on the gradient direction image. Specifically, each edge direction is encoded into an eight bit binary value as illustrated in FIG. 4. As will be described in more detail below, a particular encoded binary value for a particular edge direction is selected such that when a plurality of gradient directions are logically ORed, it is possible to determine the number of different edge directions from the resultant binary value.

Figure 5:
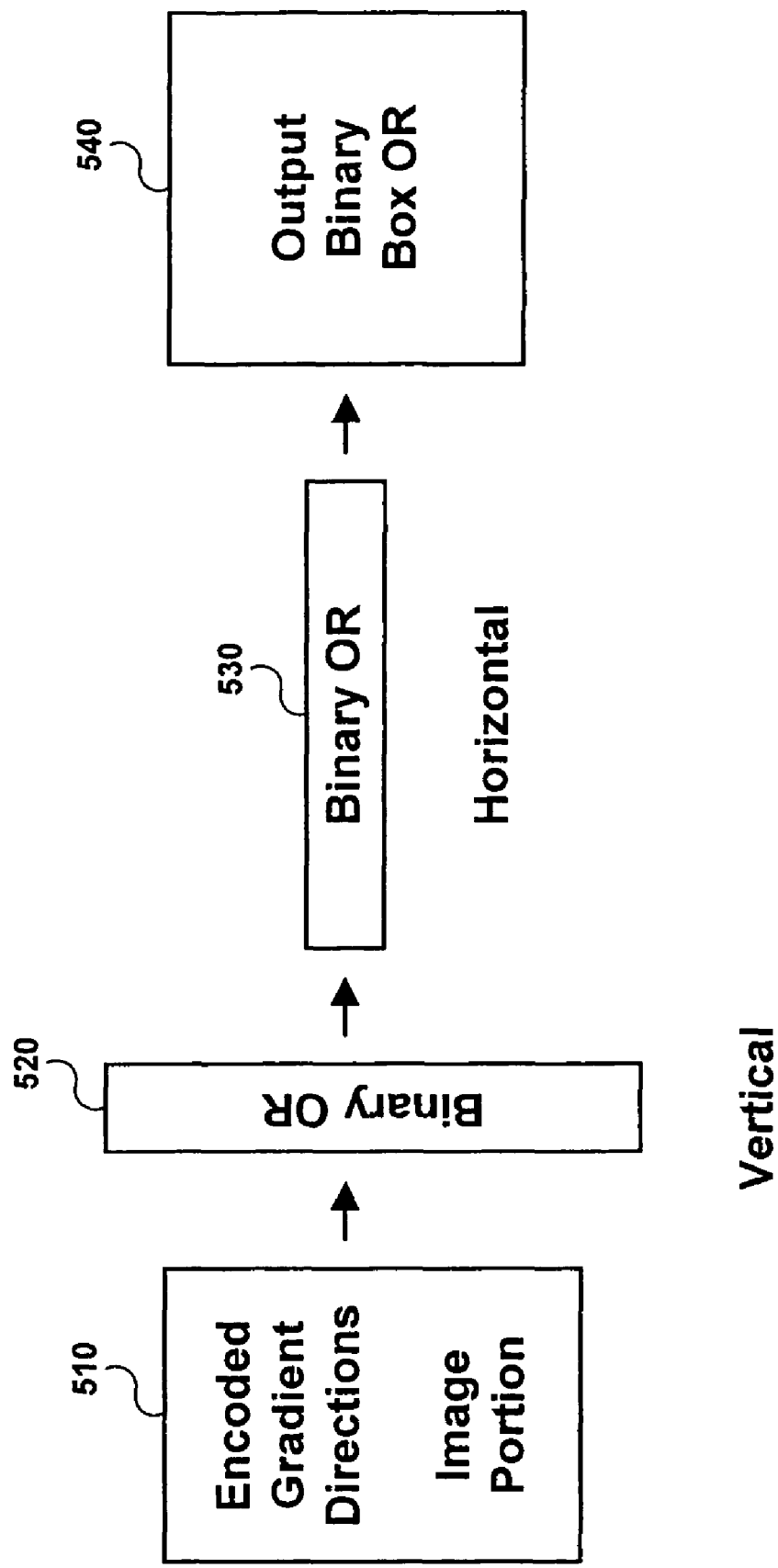
FIG. 5 is a block diagram of the processing performed on portions of the image in accordance with exemplary embodiments of the present invention.

FIG. 5 illustrates the processing performed by box sum OR processing block 140 in detail. A portion of the encoded gradient directions image 510 equal to the size of the desired object be identified is input to processing block 520 where a binary OR operation is performed in the vertical direction. This is followed by a binary OR operation in the horizontal direction in processing block 530 which outputs a binary box OR 540. Since the edge directions are encoded into one of the eight bits of a byte, the individual edge directions are added together by these binary OR operations. There is a significant improvement by performing the binary OR operation first in the vertical direction and then in the horizontal direction. In alternative embodiments, the vertical OR operation can be performed before the horizontal OR operation. For example, if a portion of the image is 32 pixels by 32 pixels, this would normally require 1023 OR's operations. If they are separated in vertical and horizontal convolutions, this requires 62 OR operations, resulting in a saving of about 16 to 1 operations. As will be described below in connection with FIG. 6, using a binary OR-ing this operation count can be reduced further.

Figure 6:
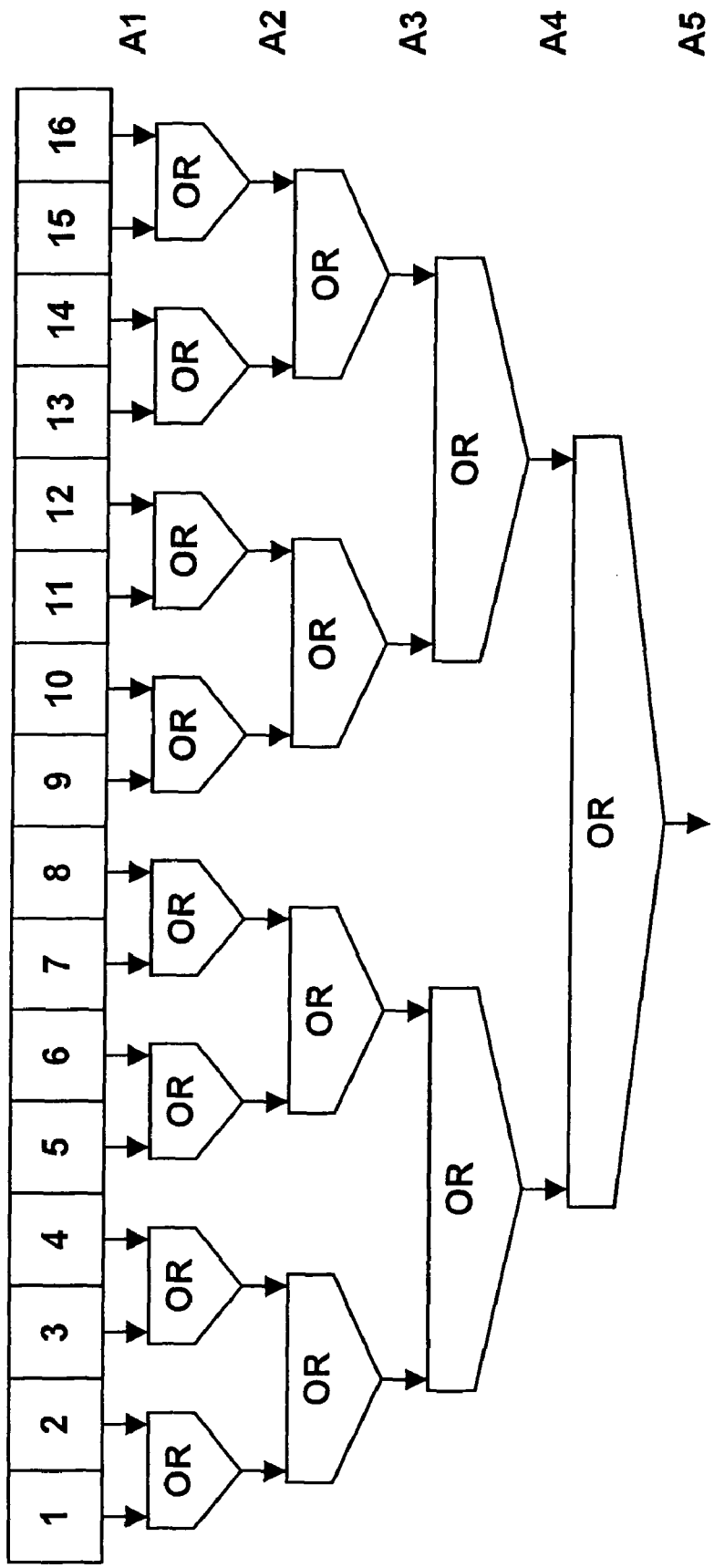
FIG. 6 is a block diagram of the processing performed for a binary OR operation in accordance with exemplary embodiments of the present invention.

FIG. 6 illustrates the processing performed by the binary OR-ing processing in accordance with exemplary embodiments of the present invention. As illustrated in FIG. 6, all encoded directions are ORed with their adjacent neighbors. This results in layer A2. Next, an OR operation is performed in layer A2 for a particular pixel with its three away neighbor, resulting in layer A3. The information in each of the pixels of layer A3 contains four OR'ed values thus saving one step. Next, in level A3, a value is OR'ed with its seven away neighbor, thus resulting in layer A4. The information in each of the pixels of layer A4 contains eight OR'ed values. This process will continue until the vertical or horizontal box size of the portion of the image is achieved. It will be noted that all the level OR operations are performed on every resulting pixel, and that there are the same number of pixels at each level. It will also be recognized that the complete sets of gates that represent this operation are not illustrated in FIG. 6, and if they were, there would be 64 gates not just the 15 illustrated. Performing the binary OR operation in this manner for a 32 pixel vertical portion of an image is from 32 OR operations down to 6 OR operation. Accordingly, operating on a 32 pixel by 32 pixel portion of the image, the number of OR operations goes from 1023 to 12 OR's for a total reduction of 83 to 1 operations.

Figure 7:
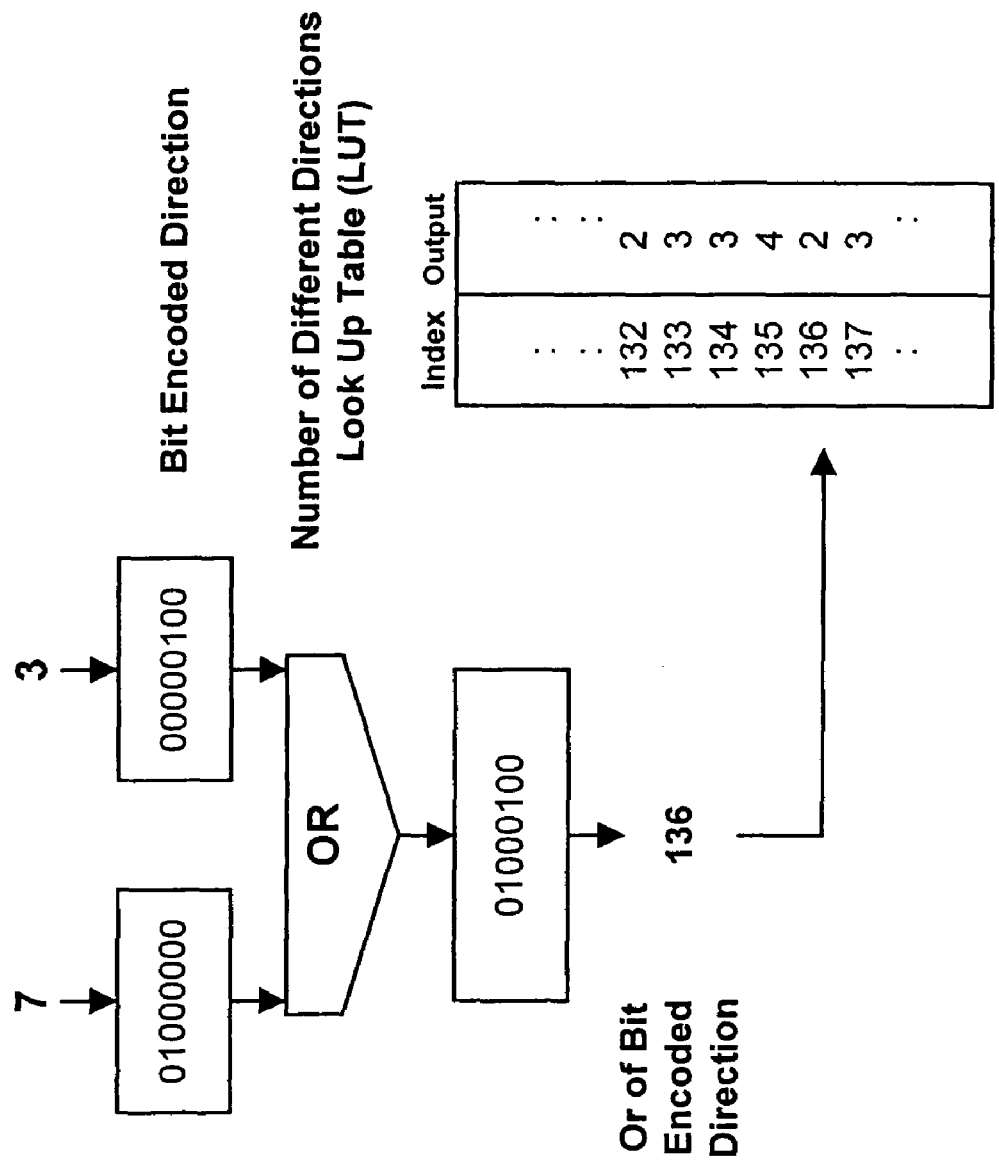
FIG. 7 is a block diagram of the processing performed for determining the number of different directions in a portion of an image in accordance with exemplary embodiments of the present invention.

FIG. 7 illustrates the binary OR-ing of two gradient directions in accordance with exemplary embodiments of the present invention. In the example illustrated in FIG. 7, a gradient direction of seven has been encoded into the binary value of 01000000, and a gradient direction of three has been encoded into a binary value of 00000100. These binary values are logically ORed to form the binary value of 01000100, equivalent to 136. Using a look up table, it is determined that the value 136 corresponds to two different gradient directions.

Figure 8:
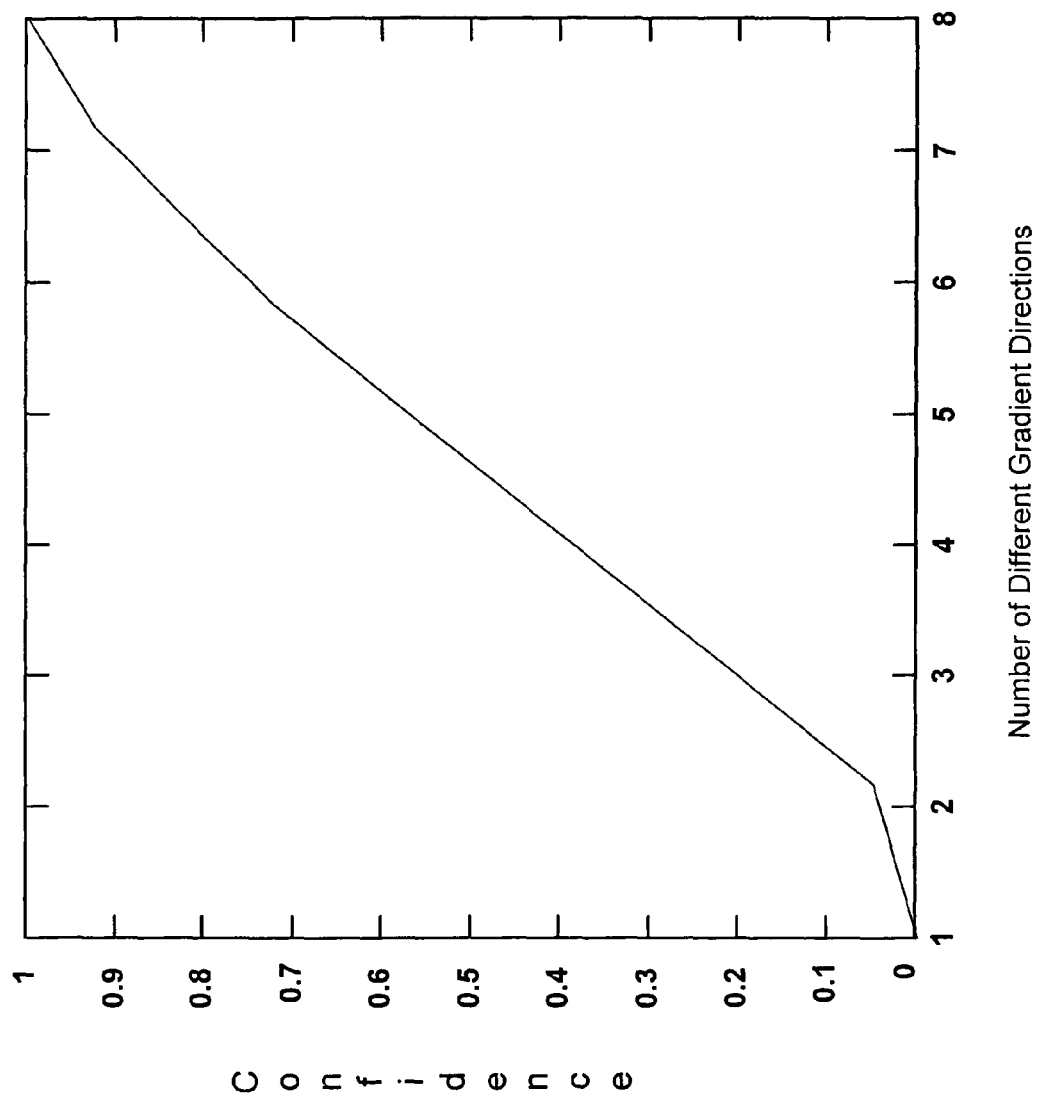
FIG. 8 illustrates an exemplary curve representing an empirically derived confidence of an object determined as a function of the count of different gradient directions in accordance with the present invention.

Once the number of different gradient directions are determined, a confidence value of the likelihood that the portion of the image identified is generated as containing an object actually contains an object is generated. FIG. 8 illustrates an exemplary curve representing an empirically derived confidence of an object determined as a function of the count of different gradient directions. As illustrated in FIG. 8, as the number of different gradient directions increase, the confidence value that the particular portion of the image is actually an object increases. It should be recognized that the use of the curve can be replaced by an appropriate classifier algorithm.

As discussed above, the present invention employs the conventional Sobel operator to determine the gradient directions. However, the conventional Sobel operator described in accordance with equations 1 through 4 above, requires 11 additions, 6 multiplications, 1 division, 1 square root, and 1 inverse tangent. Conventionally, the number of operations are decreased by performing the Sobel operation in accordance with equations 5 through 7 as follows:

$$D_x = a + 2*(d-f) + g - c - i \qquad (5)$$

$$D_y = a + 2*(b-h) + c - g + i \qquad (6)$$

$$\text{Magnitude} = abs(D_x) + abs(D_y) \qquad (7)$$

As illustrated in FIG. 5, the number of multiplications are reduced from 6 to 4 by grouping the d−f term and the b−h term. In addition, as illustrated in equation 7, by employing the absolute value of the x vector and the y vector, the square root operation can be eliminated. The gradient direction will still be calculated in accordance with equation 4.

Figure 9B:
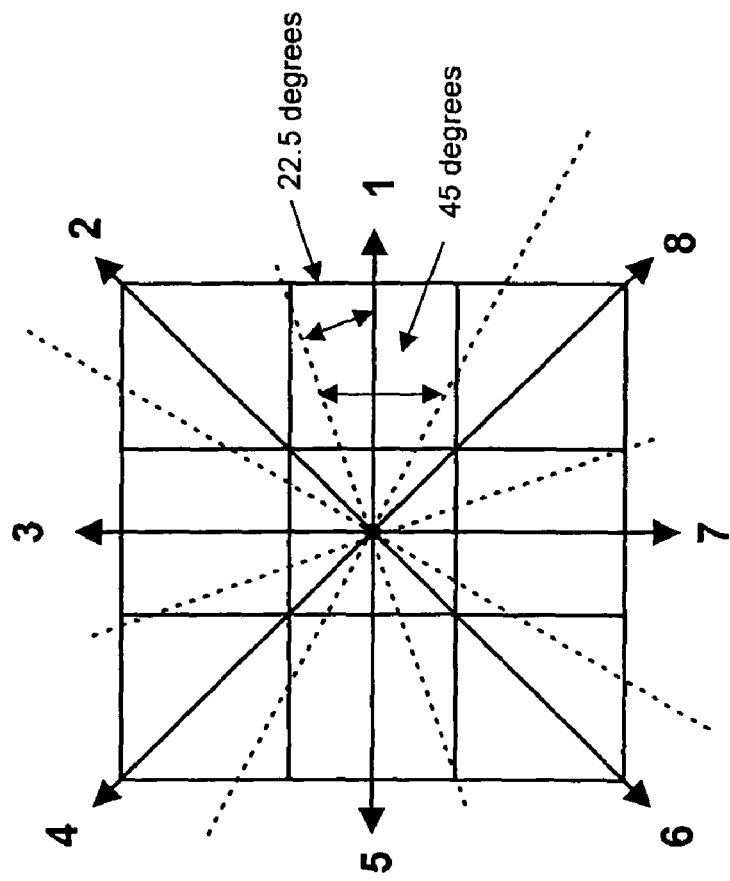
FIGS. 9A and 9B illustrate gradient directions in accordance with conventional image processing techniques.
Figure 9A:
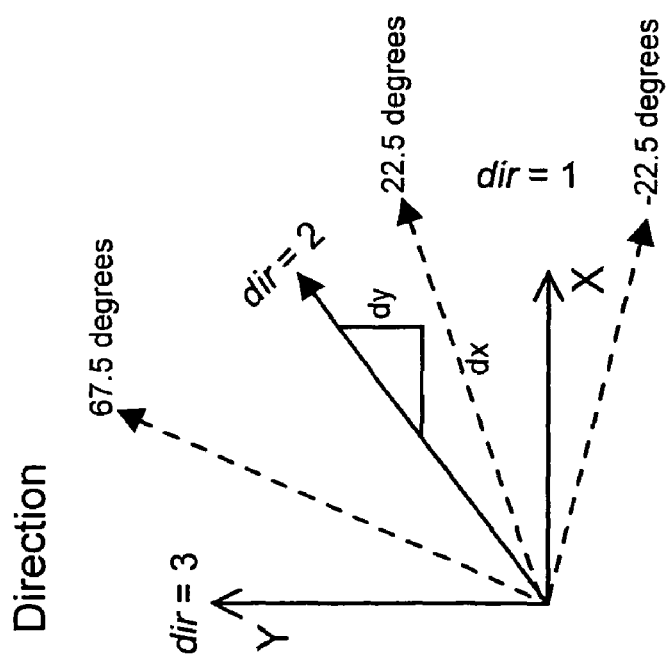

It can be desirable to further reduce the number of operations required to determine the gradient direction. Prior to describing the exemplary technique for reducing the number of operations in accordance with the present invention, a review of the gradient directions of the conventional Sobel operation will be described in connection with FIGS. 9A and 9B. As illustrated in FIG. 9B, the x axis bisects the gradient directions 1 and 5, and the y axis bisects the gradient directions 3 and 7. Accordingly, for a particular x vector and a particular y vector, a gradient direction of one will include those values 22.5° above or below the x axis. As illustrated in FIGS. 8A and 8B, the 22.5° about the x axis also exists for gradient direction 5, and about the y axis for gradient directions 3 and 7.

Figure 10B:
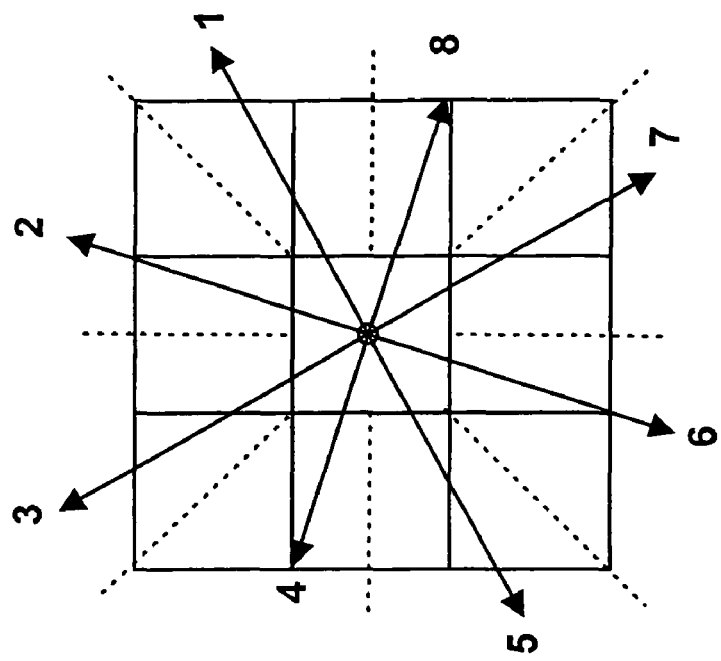
FIGS. 10A and 10B illustrate gradient directions in accordance with exemplary embodiments of the present invention.
Figure 10A:
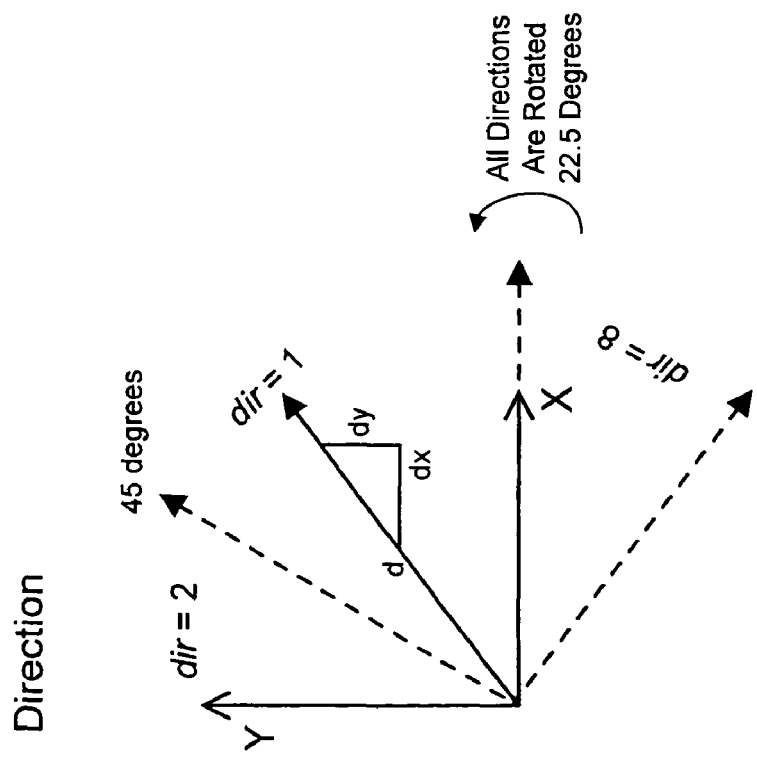

By rotating the boundaries of the gradient directions 22.5°, the calculations for the Sobel operation can be simplified. FIGS. 10A and 10B illustrate this rotation. Accordingly, as illustrated in FIG. 10A, gradient direction 1 now corresponds to the portion between the x axis and 45° above the x axis and gradient direction 8 now corresponds to the area between x axis and negative 45° from the x axis. Using this 22.5° rotation, the x vector and the y vector can be calculated in accordance with the following equations:

$$D_x = l + k + [(d-f) << 1] \qquad (8)$$

$$D_y = l - k + [(b-h) << 1] \qquad (9)$$

wherein l=a+i and k=g−c, and the double < represents a one bit binary shift to the right.

Using the x vector and the y vector, a lookup table in FIG. 11 is used to determine the gradient direction. Specifically, if the y direction vector is greater than or equal to zero, the third bit of a three bit value is set equal to one, otherwise this bit is set equal to zero. If the x vector is greater than or equal to zero, the second bit of a three bit binary value is set equal to one, otherwise this bit is set equal to zero. Finally, if the absolute value of the x vector is greater than the absolute value of the y vector, then the first bit of a three bit binary value is set equal to one, otherwise it is set equal to zero. Accordingly, three bit binary words will be calculated for each gradient direction. These three words are binary OR'ed to result in a new 3 bit binary word. This new three bit binary word can be used to determine the gradient direction as illustrated in FIG. 10. Accordingly, by using the procedures described above for the Sobel operation, requires only 10 additions and two one bit shift rights, and zero multiplications, divisions, square roots, and inverse tangents. Accordingly, it can be seen that the 22.5° rotation can greatly increase the processing speed, and reduce the processing power, required to determine the gradient direction.

Using the 22.5° rotation described above provides an adequate approximation of the gradient direction, this approximation can be improved. Specifically, using equations 10 through 15 below, takes advantage of the decrease in operations achieved by the 22.5° rotation, while compensating for this rotation.

$$D'_x = D_x * 15137 - D_y * 6270 \qquad (10)$$

$$D'_y = D_x * 6270 + D_y * 15137 \qquad (11)$$

$$d1 = [CMP(D'_x, 0)] >> 1 \qquad (12)$$

$$d2 = CMP(D'_y, 0) \qquad (13)$$

$$d3 = [CMP(abs(D'_y), abs(D'_y))] >> 2 \qquad (14)$$

$$\text{Direction} = LUT((d3)!(d2)!(d1)) \qquad (15)$$

where CMP represents a comparison operation, LUT represents a lookup table operation, and an exclamation point represents a binary OR operation.

In equations 10 and 11 the values 15,137 and 6,270 are employed to compensate for the 22.5° binary shift. Specifically, the value of 15,137 represents the cosine of 22.5° times a scaling factor, and the value 6,270 represents the sine of 22.5° times a scale factor.

For ease of understanding, the present invention has been generally described as performing processing and logical operations. The processing and logical operations can be implemented using a variety of mechanisms including, but not limited to, Application Specific Integrated Circuits (ASICs), a microprocessor which executes software code, and hard-wired logic circuits. Moreover, the tables described herein can be stored in a variety of devices including buffers, caches, Random Access Memory (RAM), Read Only Memory (ROM), and the like.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for identifying objects in an image comprising:
   processing the image with a gradient operator to produce a gradient magnitude and direction for each pixel;
   determining a number of different gradient directions in a portion of the processed image; and
   identifying the portion of the processed image as an object if the number of different gradient directions exceeds a threshold number of gradient directions.

2. The method of claim 1, wherein each possible gradient direction is associated with a unique binary value, and wherein the encoding step encodes the gradient direction for each pixel is encoded into one of the unique binary values.

3. The method of claim 2, wherein a binary OR operation of any number of the unique binary values results in a binary value which uniquely identifies a number of different gradient directions employed in the binary OR operation.

4. The method of claim 1, wherein the image is a monochrome image with image intensities on various gray levels.

5. The method of claim 1, wherein the image is processed using a Sobel operator.

6. The method of claim 1, wherein the step of processing the image comprises:
 determining a gradient magnitude for each pixel in the image; and
 determining a gradient direction for each pixel in the image, the gradient direction being determined using a look up table.

7. A method for processing an image comprising:
 determining a gradient magnitude for each pixel in the image; and
 determining a gradient direction for each pixel in the image by:
  calculating a first gradient vector and a second gradient vector for each pixel,
  generating a lookup value for each pixel based on at least one comparison of the respective first gradient vector and at least one comparison of the respective second gradient vector, and
  determining the gradient direction for each pixel by correlating the respective lookup value to a lookup table.

8. The method of claim 7, wherein the step of generating the lookup value comprises:
 determining whether the first and second gradient vectors are positive integers; and
 determining whether an absolute value of the first gradient vector is greater than an absolute value of the second gradient vector.

9. The method of claim 8, further comprising:
 setting a first binary value of a first binary word to equal one if the first gradient vector is a positive integer;
 setting a second binary value of a second binary word equal to one if the second gradient vector is a positive integer; and
 setting a third binary value of a third binary word equal to one if the absolute value of the first gradient vector is greater than the absolute value of the second gradient vector.

10. The method of claim 9, further comprising:
 performing a logic OR operation on the first, second and third binary words;
 determining a gradient direction based on a result of the logical OR operation.

11. A non-transitory computer readable-medium containing a program which executes the steps of:
 processing an image with a gradient operator to produce a gradient magnitude and direction for each pixel;
 determining a number of different gradient directions in a portion of the processed image; and
 identifying the portion of the processed image as an object if the number of different gradient directions exceeds a threshold number of gradient directions.

12. The computer-readable medium of claim 11, wherein each possible gradient direction is associated with a unique binary value, and wherein the encoding step encodes the gradient direction for each pixel is encoded into one of the unique binary values.

13. The computer-readable medium of claim 12, wherein a binary OR operation of any number of the unique binary values results in a binary value which uniquely identifies a number of different gradient directions employed in the binary OR operation.

14. The computer-readable medium of claim 11, wherein the image is a monochrome image with image intensities on various gray levels.

15. The computer-readable medium of claim 11, wherein the image is processed using a Sobel operator.

16. The computer-readable medium of claim 11, wherein the step of processing the image comprises:
 determining a gradient magnitude for each pixel in the image; and
 determining a gradient direction for each pixel in the image, the gradient direction being determined using a look up table.

17. A non-transitory computer readable-medium containing a program which causes a computer to execute the steps of:
 determining a gradient magnitude for each pixel in an image; and
 determining a gradient direction for each pixel in the image by:
  calculating a first gradient vector and a second gradient vector for each pixel,
  generating a lookup value for each pixel based on at least one comparison of the respective first gradient vector and at least one comparison of the respective second gradient vector, and
  determining the gradient direction for each pixel by correlating the respective lookup value to a lookup table.

18. The computer-readable medium of claim 17, wherein the step of generating the lookup value comprises:
 determining whether the first and second gradient vectors are positive integers; and
 determining whether an absolute value of the first gradient vector is greater than an absolute value of the second gradient vector.

19. A computer-readable medium of claim 18, wherein the computer program performs the steps of:
 setting a first binary value of a first binary word to equal one if the first gradient vector is a positive integer;
 setting a second binary value of a second binary word equal to one if the second gradient vector is a positive integer; and
 setting a third binary value of a third binary word equal to one if the absolute value of the first gradient vector is greater than the absolute value of the second gradient vector.

20. The computer-readable medium of claim 19, wherein the computer program performs the steps of:
 performing a logic OR operation on the first, second and third binary words; and
 determining a gradient direction based on a result of the logical OR operation.

21. A system comprising:
 a processor which processes the image with a gradient operator to produce a gradient magnitude and direction for each pixel, determines a number of different gradient directions in a portion of the processed image, and identifies the portion of the processed image as an object if the number of different gradient directions exceeds a threshold number of gradient directions; and
 means for outputting the identified portion of the processed image.

22. The system of claim 21, wherein each possible gradient direction is associated with a unique binary value, and wherein the encoding step encodes the gradient direction for each pixel is encoded into one of the unique binary values.

23. The system of claim 22, wherein a binary OR operation of any number of the unique binary values results in a binary value which uniquely identifies a number of different gradient directions employed in the binary OR operation.

24. The system of claim 21, wherein the image is a monochrome image with image intensities on various gray levels.

25. The system of claim 21, wherein the image is processed using a Sobel operator.

26. The system of claim 21, wherein the processor processes the image with the gradient operator by determining a gradient magnitude for each pixel in the image, and by determining a gradient direction for each pixel in the image, the gradient direction being determined using a look up table.

27. The method of claim 1, wherein the step of determining the number of different gradient directions and the step of identifying the portion of the processed image as the object are each performed in a computing apparatus.

28. The method of claim 7, wherein the step of determining the determining the gradient magnitude and the step of determining the gradient direction are each performed in a computing apparatus.

29. The method of claim 7, wherein the step of determining the gradient direction for each pixel comprises compensating for a rotation of gradient direction boundaries by rotating the first gradient vector and the second gradient vector by an angle.

30. The computer-readable medium of claim 17, wherein the step of determining the gradient direction for each pixel comprises compensating for a rotation of gradient direction boundaries by rotating the first gradient vector and the second gradient vector by an angle.

31. The method of claim 29, wherein the angle is half of a difference in angle between two adjacent ones of the gradient direction boundaries.

32. The computer-readable medium of claim 30, wherein the angle is half of a difference in angle between two adjacent ones of the gradient direction boundaries.

* * * * *